United States Patent [19]

Fivian

[11] 4,339,895
[45] Jul. 20, 1982

[54] METHOD OF GRINDING GEAR TEETH FLANKS

[75] Inventor: Daniel A. Fivian, Horgen, Switzerland

[73] Assignee: Maag Gear-Wheel & Machine Co. Ltd., Zurich, Switzerland

[21] Appl. No.: 66,443

[22] Filed: Aug. 14, 1979

[30] Foreign Application Priority Data

Aug. 18, 1978 [CH] Switzerland .................. 8774/78

[51] Int. Cl.³ .......................... B24B 1/00; B24B 9/00
[52] U.S. Cl. ................................. 51/287; 51/33 R
[58] Field of Search ............. 51/52 R, 52 HB, 56 G, 51/287, 33 R, 33 W, 55

[56] References Cited

U.S. PATENT DOCUMENTS

| | | | |
|---|---|---|---|
| 1,811,254 | 6/1931 | Bayley | 51/32 |
| 2,794,302 | 6/1957 | Deakin | 51/56 G |
| 3,803,767 | 4/1974 | Kotou | 51/33 R |
| 3,916,569 | 11/1975 | Wydler | 51/52 R X |
| 3,974,595 | 8/1976 | Wolf | 51/52 R X |

FOREIGN PATENT DOCUMENTS

| | | | |
|---|---|---|---|
| 2050946 | 4/1972 | Fed. Rep. of Germany | 51/52 R |
| 2641554 | 3/1978 | Fed. Rep. of Germany | 51/287 |

Primary Examiner—Nicholas P. Godici
Attorney, Agent, or Firm—Werner W. Kleeman

[57] ABSTRACT

A method of grinding gears is provided, wherein a workpiece support and a tool base are movable relative to one another for partial movements of the workpiece, for setting the gear teeth data, for accomplishing movements for configuring a tooth profile, and for the to-and-fro lengthwise stroke along the tooth flanks to be ground. A grinding wheel support is mounted at the tool base for pivotable movement about a pivot axis and a grinding wheel is mounted to be rotatably drivable at the grinding wheel support. The axis of rotation of the grinding wheel extends transversely with respect to the aforementioned pivot axis. The grinding wheel support is connected with the tool base by a pivot drive which, during grinding of a tooth flank, enables random changes of the grinding-pressure angle or angle of attack between the grinding wheel and the tooth flank.

8 Claims, 5 Drawing Figures

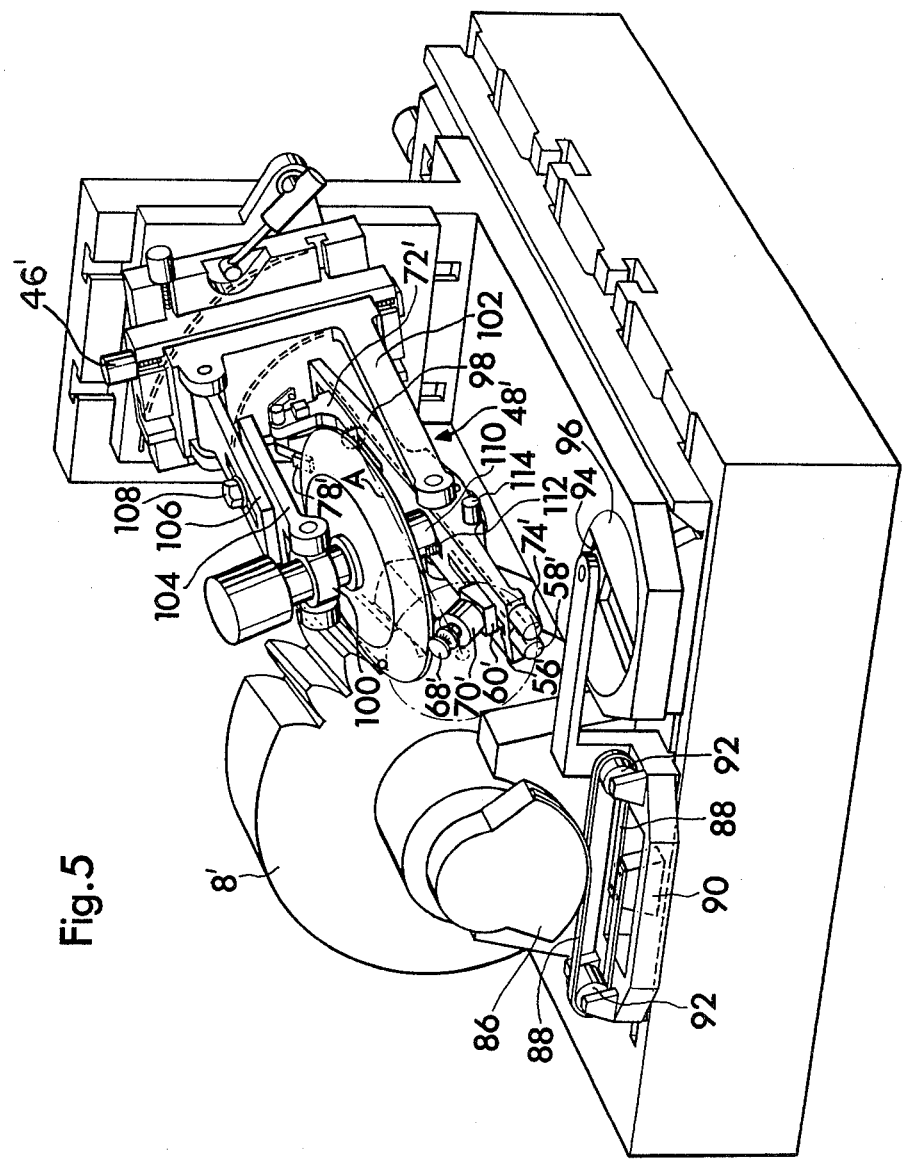

METHOD OF GRINDING GEAR TEETH FLANKS

BACKGROUND OF THE INVENTION

The present invention relates to a new and improved construction of gear grinding machine and method of grinding gear teeth flanks at such machine.

Generally speaking, the gear grinding machine of the invention is of the type comprising a workpiece support and a tool base which are movable relative to one another for partial movements of the workpiece, for setting the gear teeth data, for movements for forming a tooth profile, and for the to-and-fro lengthwise or longitudinal stroke along the tooth flanks to be ground. Additionally, there is provided a grinding wheel support which is pivotably mounted at the tool base for pivotal movement about a pivot axis. A grinding wheel is mounted to be rotatably drivable at the grinding wheel support, the rotational axis of the grinding wheel extending transversely to the pivot axis of the grinding wheel support.

In German Patent Publication No. 2,641,554 applicant has disclosed a gear grinding machine of this species. In that prior art construction two dished or plate-shaped grinding wheels or disks are each mounted at a respective pivotal grinding support or grinding wheel support, for accomplishing simultaneous grinding of a right tooth flank and a left tooth flank. The pivot axis of each grinding wheel support intersects the rotational axis of the related grinding wheel at right angles and extends at least approximately through the grinding point where the grinding wheel contacts the tooth flank and also would still contact the same if the more or less enlarged contact surface between the grinding wheel and the tooth flank, in end section, were reduced to a point with infinite small advance or feed. In order to produce involute-shaped tooth profiles, the heretofore proposed machine is equipped with a generating drive, by means of which there can be accomplished in conventional fashion, a generating motion between the gear to be ground and both of the grinding wheels. The degree of pivoting of both grinding wheel supports solely has the purpose of insuring that both grinding wheels can be adjusted at an inclination in relation to one another and in relation to the generating plane. The once selected setting or adjustment is continuously maintained during grinding of a given tooth profile. According to this prior art proposal the connection line of the grinding points or contact zones of both grinding wheels is continuously maintained during the grinding operation, at such a spacing from the base circle of the gear teeth to be ground that, in each terminal position of the generating movement, one of the grinding wheels machines a tooth tip and, at the same time, the other grinding wheel machines a tooth root. This setting of the grinding wheels results in the grinding-pressure angle or angle of attack of each grinding wheel continuously changing during the generating movement, and specifically, with a spacing radially within the tangential plane at the base circle, between a maximum at the tooth tip to a minimum at the tooth base and vice-versa, and with a spacing radially externally of the tangential plane at the base circle, between a minimum at the tooth tip to a maximum at the tooth root and vice-versa.

Under the terms "grinding-pressure angle or angle of attack" there is to be understood, just as was the case for the aforementioned prior art patent publication referred to above, and equally of the disclosure of the instant invention, the angle between the tangent at the tooth profile of the workpiece and the planar surface of the grinding wheel.

The continuous change of the grinding-angle of attack affords the advantage that appreciably more grinding grains or granules can participate in the machining or metal removal work than was possible with the older techniques where the grinding wheels or each grinding wheel acted by means of an edge, which had to be maintained sharp at all times, with a fixed grinding-angle of attack at the workpiece. This in effect means that already, according to the heretofore known proposal, the number of grinding grains participating in the grinding work is increased, so that also then when the grinding wheels are relatively seldomly dressed, there is always available a sufficient number of sharp-edged grinding grains, so that there can be removed from the workpiece a multiplicity of small individual chips or cuttings. By virtue of the continuous change of the grinding-angle of attack there is made better use of the pore volume of the grinding wheel for removal of the chips or cuttings. Due to the changing grinding-angle of attack there also is continuously altered the flow angle of the chips or the like. Consequently, there is a lesser danger that the chips will tend to wedge into the pores, which, in turn, has the benefit that there is reduced the danger of grinding wheel burn. Because of the balance effect, associated with the continuously changing grinding-angle of attack, the grinding grains tend to break away before they become excessively dull. This phenomenon leads to the result that, according to the prior art proposal, there can be obtained a higher grinding efficiency and there is reduced the consumption or using up of the grinding wheel which is caused by the dressing work.

According to the heretofore known prior art proposal the change of the grinding-angle of attack, arising during the generating movement between the grinding wheels and workpiece, exclusively is a consequence of the aforementioned spacing between the connection line of the grinding points of both grinding wheels and the base circle of the gear. This spacing cannot be selected to be randomly large, since otherwise the ground tooth profile would deviate, to an undesired degree, from a purely involute profile. Consequently, the advantages of an increased grinding efficiency, which are attributable to changing the grinding-angle of attack during each generating stroke, in other words, an increased volume of material removal per unit of time and a reduced consumption of the grinding wheels per unit of machined workpiece volume, can only be obtained to a limited degree and dependent upon the data of the gear teeth which are to be ground.

SUMMARY OF THE INVENTION

Therefore, with the foregoing in mind it is a primary object of the present invention to provide a new and improved construction of gear grinding machine and method of grinding gear teeth flanks at such machine, which is not afflicted with the aforementioned drawbacks and limitations of the prior art proposals.

Still a further significant object of the present invention aims at providing a new and improved construction of a gear grinding machine of the previously described character which is designed such that it enables a still greater increase of the grinding efficiency or capacity, independent of the data of the gear teeth which are to be ground.

Yet a further significant object of the present invention is directed to the provision of a novel gear grinding machine and method of grinding gear teeth flanks at such machine in a manner not afflicted with the aforementioned shortcomings of the prior art proposal, and wherein such machine and method is economical in its operation, extremely reliable, affords high precision grinding work, and further, the grinding machine itself is relatively simple in construction, economical to manufacture, not readily subject to breakdown or malfunction and requires a minimum of maintenance and servicing.

Now in order to implement these and still further objects of the invention, which will become more readily apparent as the description proceeds, the gear grinding machine of the present development is manifested by the features that the grinding wheel support is connected with the tool base by means of a pivot drive which, during grinding of a tooth flank, renders possible random or arbitrary changes of the grinding-angle of attack between the grinding wheel and the tooth flank within predetermined limits.

This solution is basically independent of whether (i) the grinding machine is equipped with one or two grinding wheels, (ii) the relative movements between the workpiece and the grinding wheel or grinding wheels is controlled by a generating drive or, for instance, by a templet, or, by the program of a computer according to coordinates. The advantages of a random pivoting of the grinding wheels are also independent of whether the connection line of the grinding points of two simultaneously effectual grinding wheels which work a right tooth flank and a left tooth flank, is maintained at a spacing from the base circle of the gear teeth.

If a gear grinding machine containing the features of the invention is provided, like the heretofore known machines of the previously mentioned type, with a generating drive for producing an involute-shaped relative movement between the workpiece support and grinding wheel, then the pivot axis of the grinding wheel support, just as was the case with the heretofore known prior art proposal, advantageously extends at least approximately through the grinding point of the related grinding wheel. In this case there can then be dispensed with, in any event, correction movements of the grinding wheels if there are not required deviations from the involute profile, such as for instance, tooth tip and/or tooth root reduction. It is even possible to accomplish according to plan, tooth tip and tooth root reductions by a certain deviation of the grinding point from the pivot axis of the related grinding wheel support.

By virtue of the inventive construction of a machine of the previously mentioned type there is furthermore attained the possibility of realizing the advantage of a considerably increased grinding efficiency even without the use of the conventional generating drive or gearing. This is accomplished, according to a further construction of the invention, in that the pivot axis of the grinding wheel support extends in spaced relationship from the grinding point of the related grinding wheel and the grinding wheel is mounted upon a pillow or bearing block which is adjustable, in relation to the grinding wheel support, in two directions enclosing a right angle with one another.

If there are to be ground tooth flanks upon a gear grinding machine of the previously mentioned species, possessing a drive or gearing arrangement for the to-and-fro generating movements between the tooth flank and grinding wheel, then, in accordance with the heretofore known proposal, the grinding-angle of attack can increase or decrease along the path from the tooth root to the intermediate region of the tooth flank. According to the invention this grinding technique is further expanded upon in that, the grinding-angle of attack is increased along the path from the tooth tip to the intermediate region of the tooth flank, at that location reaches it maximum, and then is again reduced. Stated another way: the grinding-angle of attack, as contemplated by the invention, increases along the path of the grinding point over the tooth flank from the tooth tip to the intermediate region of the tooth flank and from that location again reduces towards the tooth root or base. During generating grinding the workpiece velocity is greatest at the intermediate region of the tooth flank, whereas it temporarily reaches the value null at the reversal points of the generating motion at the tooth tip and at the tooth root. Increasing the grinding-angle of attack to a maximum at the intermediate region of the tooth flank, as contemplated by the invention, means that the grinding wheel, at the location where the workpiece velocity is greatest, also insures for the most effective emptying of the pores of the grinding wheels, and thus, there can be increased the volume of the machining or cutting work.

If, on the other hand, a gear grinding machine, as contemplated by the invention, is constructed such that the pivot axis of the grinding wheel support extends in spaced relationship from the grinding point of the related grinding wheel and the grinding wheel is mounted upon a pillow block displaceable, in relation to the grinding wheel support, in two directions enclosing a right angle with one another and with the pivot axis, then it is possible to deviate from the conventional partial-generating method in that, the to-and-fro generating motions between the tooth flank and grinding wheel are simulated inasmuch as the grinding wheel is pivotable to-and-fro about the pivot axis. This pivot axis extends approximately through the intersection point of two tangents at the base circle of the gear teeth which are to be ground, wherein the one tangent extends through the tooth tip point and the other tangent through the tooth base point of the tooth profile. For obtaining the desired tooth profile it is possible to vary, during the pivoting, the spacing of the pivot axis from the work or operating point of the grinding wheel.

The requisite coordination between the pivoting of the grinding wheel and the changes of the spacing of the pivot axis from the work point is advantageously controlled by a computer in which there is stored the desired tooth flank profile and the desired changes of the grinding-angle of attack and the permissible changes of the spacing of the pivot axis from the work point of the grinding wheel, in consideration of the available work space. It is of course evident that in such computer there can be infed, at relatively brief time intervals, also data which can be determined by scanning the work surface of the grinding wheel and provides information concerning its wear and which, finally, also serves for taking into account the wear of the grinding wheels by compensating measures.

In order to perform the inventive method which has been described heretofore, the position of the pivot axis of the grinding wheel is beneficially chosen such that the amount, by which there must be varied the spacing of the pivot axis from the work point, does not exceed 10 millimeters. Preferably, the variation of the spacing of the pivot axis from the work point, during grinding of a tooth flank, amounts to about 0.5 millimeter.

With the different exemplary embodiments of the inventive method it is furthermore advantageous if the difference between the largest and the smallest grinding-angle of attack, during grinding of a tooth flank, is limited to about 0.5° to 25°; preferably this difference amounts to about 1° to 4°.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 5 is a perspective view of a gear grinding machine for grinding helical spur gears.

DETAILED DESCRIPTION OF THE PREFERRED EMBODIMENTS

Figure 1:
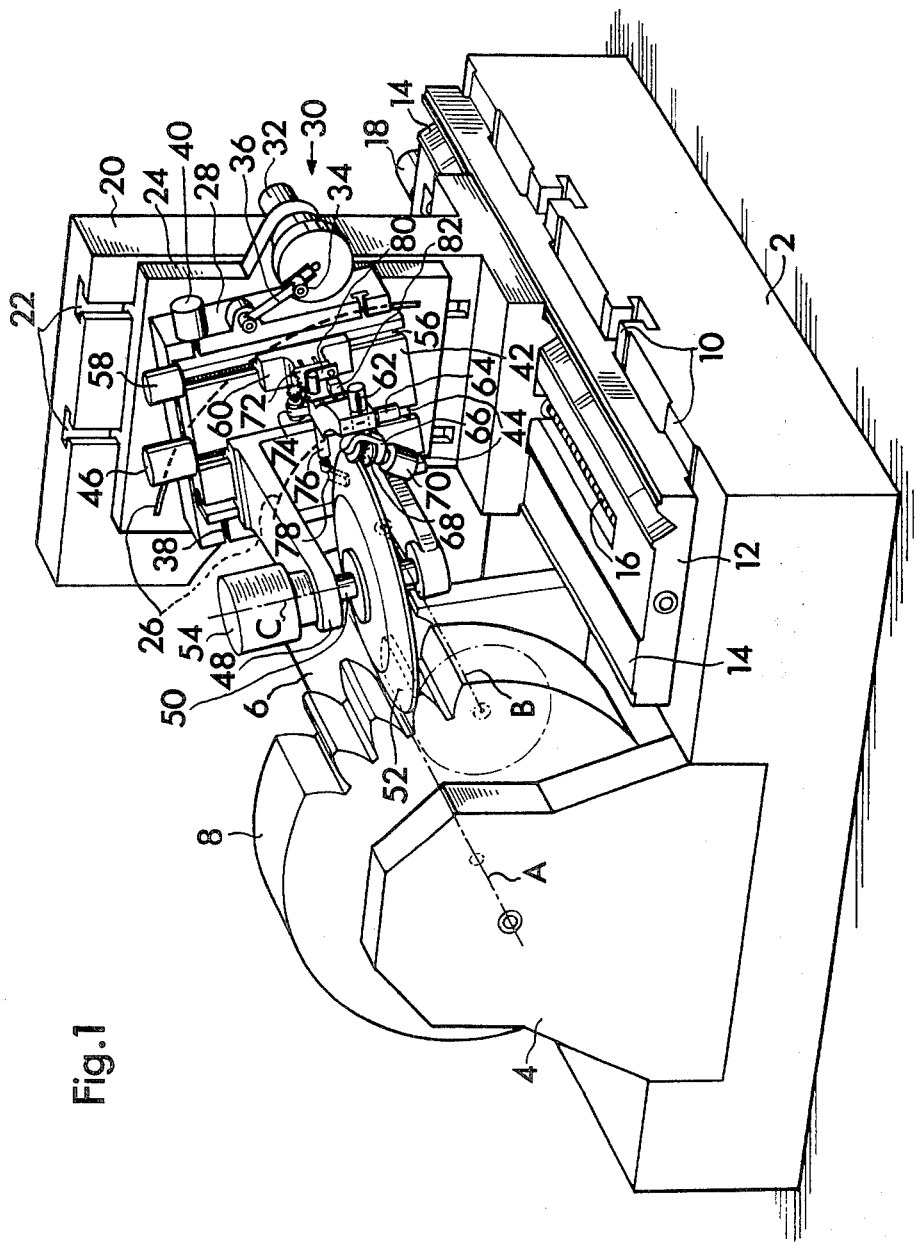
FIG. 1 is a perspective view of a gear grinding machine for grinding straight toothed-spur gears.

Describing now the drawings, the exemplary embodiment of gear grinding machine, illustrated in FIG. 1, will be seen to comprise a machine bed 2 upon which there is attached a workpiece mounting or support arrangement 4. In the workpiece mounting or support arrangement 4 there is rotatably mounted a workpiece support or carrier 6 for rotational movement about an essentially horizontally dispositioned workpiece axis A. The workpiece support 6 is constructed for clamping or chucking thereat a workpiece here constituted by a gear 8, the gear flanks of which should be ground. Belonging to the workpiece mounting or support arrangement 4 is a not particularly illustrated, but conventional, indexing apparatus, rendering possible the stepwise rotational indexing of the gear 8 in accordance with the tooth pitch.

Arranged at the machine bed 2 are essentially horizontal guides or guideways 10 extending substantially at right angles to the workpiece axis A. A bed carriage or slide 12 is displaceable along the guides 10. This bed carriage or slide 12, in turn, is provided with guides or guideways 14 extending essentially parallel to the workpiece axis A. Mounted parallel to the guides 14 is a threaded spindle 16 in the bed carriage or slide 12. The threaded spindle 16 can be driven by a suitable drive motor 18 which is attached at the bed carriage or slide 12 and meshes with an upright or stand 20 displaceable along the guides 14, upon the bed carriage or slide 12. This upright 20 is equipped with vertical guides or guide means 22, along which there is adjustable a tool base or base member 24.

The tool base member 24 has the configuration of an essentially flat or planar plate extending orthogonally with respect to the workpiece axis A. Machined at the tool base member 24 are mutually concentric arcuate guides 26, the axis of which, designated hereinafter as the pivot axis B, extends essentially parallel to the workpiece axis A. A likewise substantially plate-shaped grinding support or grinding wheel support 28 is guided at the arcuate guides 26 in such a manner that it can pivot or rock about the pivot axis B. The grinding support 28 is operatively connected with the tool base member 24 by means of a pivot drive 30. This pivot drive 30 is provided with a drive motor 32 arranged at the tool base member 24, a crank pin 34 driven by the motor 32 and having adjustable eccentricity, and a connecting rod 36 mounted at one end at the crank pin 34 and at the other end at the grinding support or grinding wheel support 28 and having an adjustable length.

The grinding support 28 is provided with guides or guide means 38 at the side facing away from the tool base member 24. These guides 38 extend at right angles with respect to the pivot axis B. Along the guides 38 there is displaceable a radial carriage or slide 42, by means of a motor 40 arranged at the grinding support 28. This radial carriage 42, in turn, possesses guides or guide means 44, likewise extending at right angles or orthogonally with respect to the pivot axis B and, at the same time, at right angles with respect to the guides or guide means 38. By means of a motor 46 arranged at the radial carriage 42 a pillow or bearing block 48 or equivalent structure can be adjusted along the guides 44. Mounted upon the pillow or bearing block 48 or equivalent structure is a grinding spindle 50, extending parallel to the guides 44, carrying a dished grinding wheel or disk 52 and being rotatably drivable by means of a drive motor 54 arranged at the pillow or bearing block 48. The geometric axis of the grinding spindle 50—also sometimes referred to herein as the grinding wheel spindle—and the grinding wheel 52 will be designated hereinafter as the rotational axis C.

The radial carriage 42 possesses a further guide or guide means 56, extending essentially parallel to the guides 44, and along which there is adjustable, by means of a motor 58 or the like, a dressing carriage or slide 60. Upon the dressing carriage 60 there is guided a guide bolt 62, or equivalent structure, extending essentially at right angles to the axis of rotation C and adjustable in its lengthwise direction by means of a motor 64. The guide bolt 62 carries a bearing or mounting bracket 66 in which there is mounted a diamond roll 68 for dressing the grinding wheel 52. This diamond roll 68 or other suitable dressing tool is rotatably drivable, by means of a suitable drive motor 70 arranged at the bearing or mounting bracket 66, in the same or opposite direction in relation to the rotational sense of the grinding wheel 52.

Continuing, displaceably guided upon the dressing carriage or slide 60 is a feeler carriage or slide 72 for movement essentially parallel to the pivot axis B. A drive motor 74 is arranged at the dressing carriage 60 in order to displace the feeler carriage or slide 72. Mounted at the feeler carriage 72 is a feeler shaft 76 which extends essentially at right angles with respect to the pivot axis B and the rotational axis C. This feeler shaft 76 carries at one end a feeler or sensor 78, and at its other end a lever 80. The feeler 78 is provided for the purpose of feeling or scanning the grinding wheel 52. Operatively associated with the lever 80 is a switch 82 or equivalent structure arranged at the feeler carriage 72, this switch 82 then being actuated by the lever 80 whenever the grinding wheel 52 has been worn by a predetermined amount.

With the exemplary embodiment of gear grinding machine, as shown in FIG. 1, the gear 8 is stationary during such time as one of its tooth flanks is ground. The pillow or bearing block 48 is adjusted in such a way that the grinding point $P_1$, where the grinding disk 52, driven by the drive motor 54, contacts a tooth flank has a spacing $r_M$ from the pivot axis B. During grinding the grinding support 28 together with the pillow block 48 and the grinding wheel 52 carry out to-and-fro pivotal movements or oscillations about the pivot axis B, such being caused by the pivot drive or drive means 30. These pivotal movements have superimposed thereon movements of the pillow block 48 along the guides 44 in such a manner that the grinding point $P_1$ moves to-and-fro between a point $P_a$ at the tooth tip and point $P_f$ at the tooth root or base, if the upright 20 were stationary. However, in fact the upright 20, during grinding, is displaced continuously along the guides 14, so that the grinding point $P_1$ migrates in a zig-zag configuration over the tooth flank.

Figure 2:
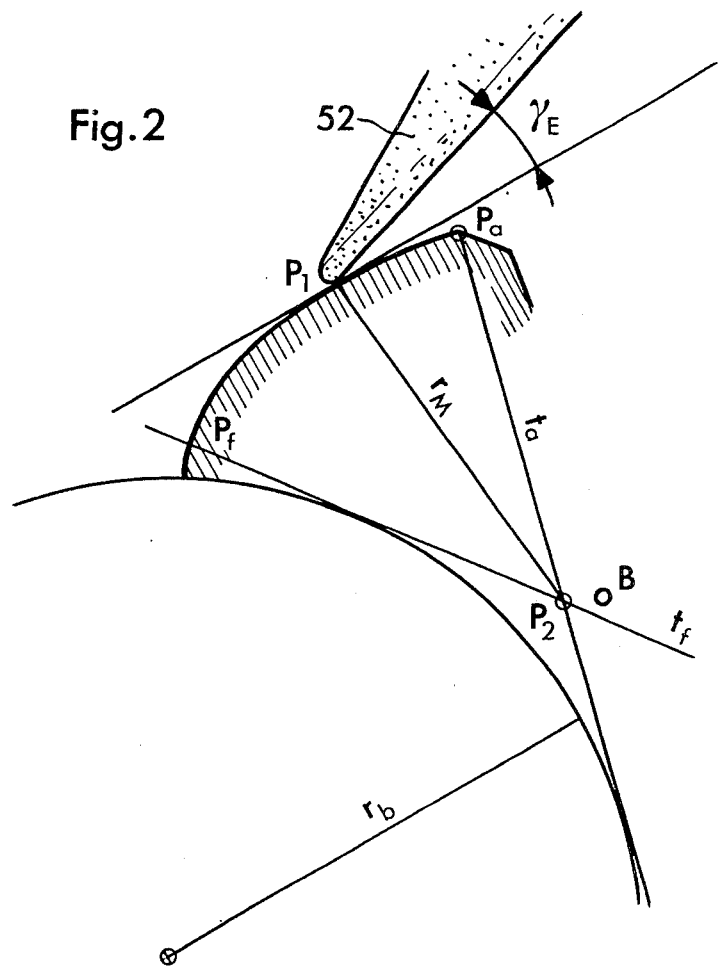
FIG. 2 schematically illustrates the interaction or engagement relationship between a tooth flank and the grinding wheel of the gear grinding machine of FIG. 1, the gear being shown in end or front section.

The movements of the pillow block 48 along the guides 44 are necessary, because the tooth profile which is to be ground can deviate to various degrees from an arc, and therefore, cannot be ground merely by the pivotal movements of the grinding wheel 52 about the pivot axis B. The magnitude of the requisite movements of the pillow or bearing block 48 along the guides 44, which in end effect constitute axial movements of the grinding wheel 52, depends upon the location of the pivot axis B in relation to the tooth flank to be ground. According to the showing of FIG. 2, the pivot axis B preferably extends at the region of a point $P_2$ where two predetermined tangents intersect one another at the base circle (radius $r_b$) of the gear teeth to be ground, namely the tangent $t_a$ through the tooth tip point $P_a$ and the tangent $t_f$ through the tooth root point $P_f$. The pivotal movements of the grinding wheel 52 about the pivot axis B, generated by the pivot drive 30, are continuously combined, during the grinding, with axial displacements of the grinding wheel 52, in other words with displacements of the pillow or bearing block 48, generated by the drive motor 46, along the guides 44 and the displacements of the radial carriage 42 along the guides 38, produced by the motor 40, in such a manner that, on the one hand, there is produced the desired tooth flank profile and, on the other hand, there continuously changes the grinding-angle of attack $\gamma_E$.

The gear grinding machine of FIG. 1, described previously as to its construction and mode of operation, does not require a generating drive or gearing of conventional construction for producing the generating movements between the gear 8 and the grinding wheel 52. This is so because all of the requisite movements, with the gear 8 stationary, can be produced as movements of the grinding wheel 52 by the pivot drive 30 and by the drive motors 40 and 46.

Figure 3:
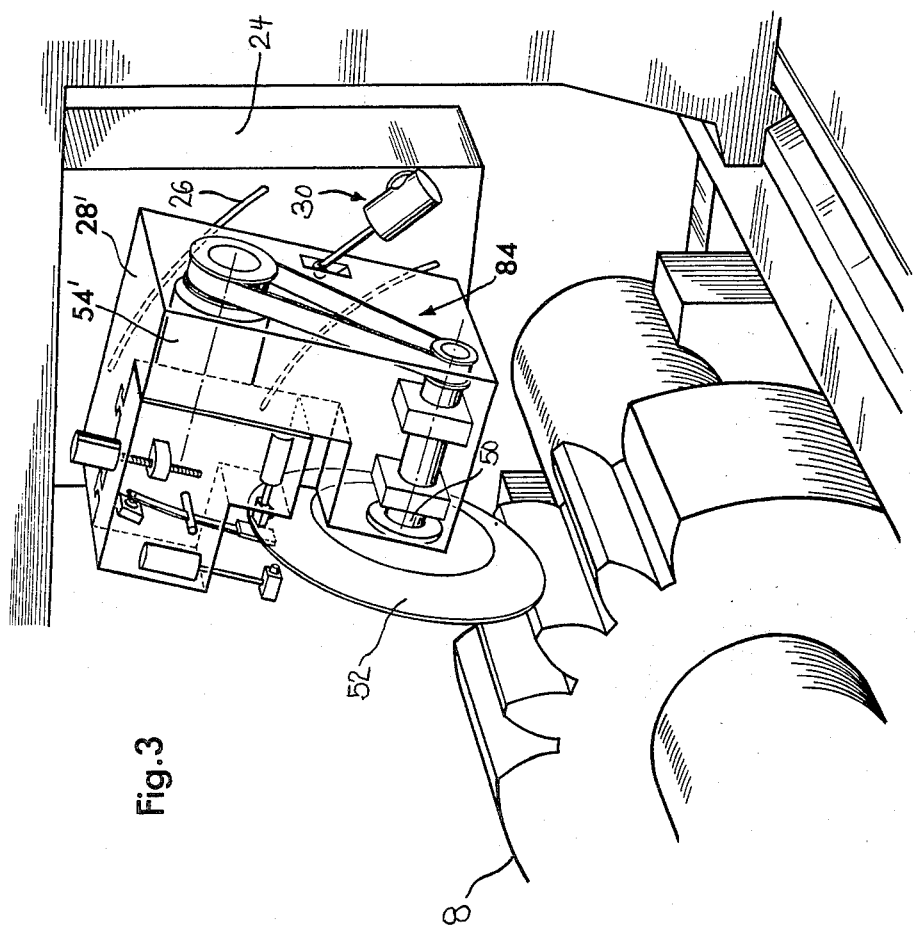
FIG. 3 is a fragmentary perspective view illustrating details of a gear grinding machine having a simplified construction from that shown in the embodiment of FIG. 1.

In contrast thereto, the embodiment of FIG. 3 requires the utilization of a generating drive or gearing of conventional construction, for producing the generating movements between the gear 8 and the grinding wheel 52, wherein rotational and translatory components of such generating movements can be divided between the gear 8 and the grinding wheel 52. It is possible, for instance, that the gear 8 performs the rotational components of the generating or rolling movement in the form of to-and-fro rotations about the workpiece axis A, whereas the grinding wheel 52 has imparted thereto the translatory movement components in that, the bed carriage 12 is moved to-and-fro along the guides 10. The machine construction shown in FIG. 3, like that of the embodiment of FIG. 1, has a tool base member 24 provided with arcuate guides 26. Pivotally mounted at the arcuate guides 26 is a simplified grinding support or grinding wheel support 28' for pivotal movement about the pivot axis B. In order to pivot or rock the grinding support 28 there is also here provided a pivot drive 30, which can be constructed as in FIG. 1, but however also for instance can be designed as a piston-and-cylinder unit which is hingedly connected, on the one hand, with the tool base member 24, and, on the other hand, with the grinding support 28'.

Figure 4:
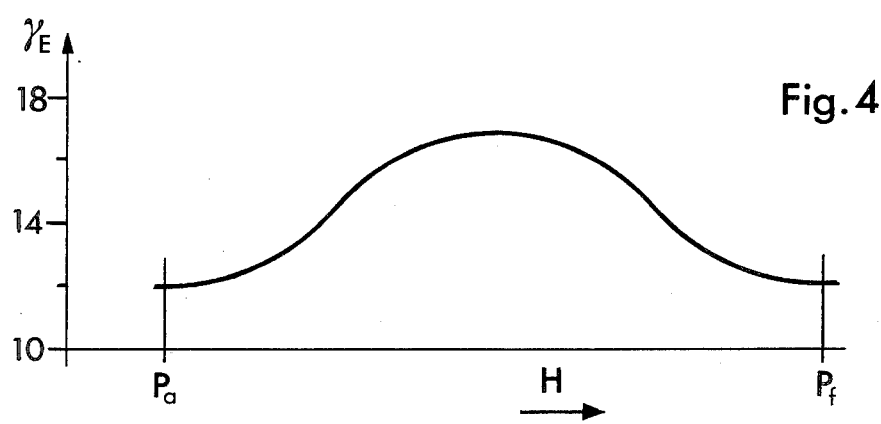
FIG. 4 is a diagram illustrating the changes of the grinding-angle of attack during a generating stroke of the machine illustrated in FIG. 3.

The grinding machine of FIG. 3 differs from that shown and discussed above with respect to FIG. 1 particularly in that the grinding spindle 50 is not directly connected, rather by means of a belt drive 84 with a drive motor 54' for driving the grinding wheel 52. This drive motor 54' is attached at the tool base 24, and thus, does not participate in the pivotal movements of the grinding support 28'. The belt drive 84 is readily capable of compensating the relatively small angular changes between the rotational axis C of the grinding wheel 52 and the axis of the motor 54. The grinding wheel 52 is adjusted such that its grinding point $P_1$ always is located at the pivot axis B. The pivotal movements of the grinding wheel 52 about the pivot axis B therefore do not have any effect upon the tooth shape or profile, which is determined by the generating movements between the gear 8 and the grinding wheel 52. The sole purpose of pivoting of the grinding wheel 52 about the pivot axis B is to alter the grinding-angle of attack $\gamma_E$, by means of which always other annular or ring-shaped zones of the grinding wheel 52 come into engagement with the tooth flank, thereby increasing the grinding efficiency or capacity. An example of an advantageous course of the grinding-angle of attack $\gamma_E$ throughout the generating stroke H has been shown in FIG. 4.

Now the gear grinding machine illustrated in FIG. 5 corresponds to the embodiment of FIG. 1, with the difference that it is also suitable for grinding a helical gear 8'. To this end there is required a helical relative movement between the helical tooth-gear 8' and the grinding wheel 52, which must be synchronized with the movements of the upright or stand 20 along the guides 14 of the bed carriage 12. For this purpose there is attached, in known manner at the workpiece support 6, a rolling block 86 connected by means of the rolling tapes 88 with a rolling tape carriage 90. The rolling tapes 88 are guided over deflection rolls 92 mounted at the rolling tape carriage 90. This rolling tape carriage 90 is displaceably guided in one of the guides 10 of the machine bed 2 for movement essentially at right angles to the workpiece axis A and is connected, by means of a cam block or follower 94 mounted thereat, with a cam guide 96 or equivalent camming means, which extends in an essentially horizontal plane and, in accordance with the desired tooth helix angle, can be inclinably adjustably attached at the upright or stand 20.

In accordance with the desired gear tooth-helix angle it is also necessary to inclinably or obliquely position the grinding wheel 52. For this purpose the grinding spindle 50 is mounted, on the one hand, in a sleeve or bushing 110, and, on the other hand, in a ring 100 or equivalent structure. This sleeve 110 is mounted at a rigid leg 102 of the pillow or bearing block, here designated by reference character 48′, for pivotal movement about an axis extending essentially at right angles with respect to the pivot axis B and the axis of rotation C. The ring or ring member 100 is pivotably mounted at a bracket or strap 104 or the like about an axis which is parallel to the aforementioned pivot axis of the sleeve 110. This bracket 104 is adjustably attached at an articulated or hinged leg 106 of the pillow or bearing block 48′ by means of a clamping device 108. A support 98 is mounted upon the sleeve 110 and can be moved away from or towards the grinding wheel 52, by means of a gear rack drive 112 having a drive motor 114. Hence, it is possible to compensate the axial grinding wheel-wear by axially adjusting the grinding wheel 52 by means of the motor 46′, and in synchronism with such adjustment there is always adjusted by the same amount the support 98.

With the machine construction of FIG. 5, the support 98 assumes part of the function of the radial carriage 42 provided for the embodiment of gear grinding machine shown in FIG. 1. Thus, at the support 98 there is provided a guide 56′, along which there is adjustable, by means of a suitable drive motor 58′, a dressing carriage or slide 60′. Also in this case there is mounted upon the dressing carriage 60′ a diamond roll 68′ and rotatably drivable by means of a suitable drive motor 70′. A feeler carriage 72′ is adjustable, by means of a motor 74′, along the guide 56′, at the other side of the grinding wheel 52. Mounted in a manner similar to the feeler 78 of the arrangement of FIG. 3, here there is mounted a feeler 78′ at the feeler carriage 72′.

While there are shown and described present preferred embodiments of the invention, it is to be distinctly understood that the invention is not limited thereto, but may be otherwise variously embodied and practiced within the scope of the following claims. Accordingly,

What I claim is:

1. A method of grinding tooth flanks upon a gear grinding machine comprising a workpiece support and a tool base relatively movable with respect to one another, a grinding wheel support pivotably mounted at the tool base for pivotal movement about a pivot axis, a grinding wheel mounted to be rotatably drivable at said grinding wheel support, said grinding wheel having an axis of rotation arranged transversely with respect to said pivot axis, pivot drive means for connecting said grinding wheel support with said tool base, said pivot drive means enabling, during grinding of a tooth flank, random changes of the grinding-angle of attack between the grinding wheel and the tooth flank within predetermined limits, and gearing means for to-and-fro partial generating movements between the tooth flank and the grinding wheel, which method comprises the steps of:
   increasing the grinding-angle of attack along the path from the tooth root to the intermediate region of the tooth flank; and
   increasing the grinding-angle of attack also along the path from the tooth head to the intermediate region of the tooth flank and at that location said grinding angle of attack reaches its maximum.

2. The method as defined in claim 1, further including the steps of:
   limiting the difference between the largest and the smallest grinding-angle of attacks, during grinding of a tooth flank, so as to amount to a range of about 0.5° to 25°.

3. The method as defined in claim 2, further including the steps of:
   selecting said difference between the largest and the smallest grinding-angles of attack so as to amount to about 1° to 4°.

4. A method of grinding tooth flanks upon a gear grinding machine comprising a workpiece support and a tool base relatively movable with respect to one another, a grinding wheel support pivotably mounted at the tool base for pivotal movement about a pivot axis, a grinding wheel mounted to be rotatably drivable at said grinding wheel support, said grinding wheel having an axis of rotation arranged transversely with respect to said pivot axis, pivot drive means for connecting said grinding wheel support with said tool base, said pivot drive means enabling, during grinding of a tooth flank, random changes of the grinding-angle of attack between the grinding wheel and the tooth flank within predetermined limits, which method comprises the steps of:
   simulating the to-and-fro generating movements between the tooth flank and the grinding wheel by pivoting the grinding wheel back-and-forth about the pivot axis, said pivot axis extending approximately through the point of intersection of two tangents at the base circle of the gear teeth to be ground;
   one of the tangents extending through the tooth tip point and the other tangent through the tooth base point of the tooth profile; and
   varying the spacing of the pivot axis from a work point of the grinding wheel during the pivotal movement in order to obtain the desired tooth profile.

5. The method as defined in claim 4, further including the steps of:
   selecting the position of the pivot axis such that the value through which the spacing of the pivot axis from the work point varies does not exceed 10 millimeters.

6. The method as defined in claim 5, further including the steps of:
   selecting the position of the pivot axis such that the variation of the spacing of the pivot axis from the work point during grinding of a tooth flank amounts to about 0.5 millimeters.

7. A method of grinding tooth flanks upon a gear grinding machine comprising the steps of:
   providing a grinding wheel affording random changes of the grinding-angle of attack between the grinding wheel and the tooth flank within predetermined limits;
   increasing the grinding-angle of attack along the path from the tooth root to the intermediate region of the tooth flank; and
   increasing the grinding-angle of attack also along the path from the tooth head to the intermediate region of the tooth flank and at that location said grinding-angle of attack reaches its maximum.

8. A method of grinding tooth flanks upon a gear grinding machine comprising the steps of:
   providing a grinding wheel pivotable about a pivot axis and enabling, during grinding of a tooth flank, random changes of the grinding-angle of attack between the grinding wheel and the tooth flank within predetermined limits;

simulating to-and-fro generating movements between the tooth flank and the grinding wheel by moving the grinding wheel back-and-forth about the pivot axis, said pivot axis extending approximately through the point of intersection of two tangents at the base circle of the gear teeth to be ground;

one of the tangents extending through the tooth tip point and the other tangent through the tooth base point of the tooth profile; and varying the spacing of the pivot axis from a work point of the grinding wheel during the pivotal movement in order to obtain the desired tooth profile.

* * * * *